Nov. 14, 1933.  C. CRETORS  1,935,435
COMBINED MELTING POT AND WORKSTAND
Filed Dec. 14, 1931
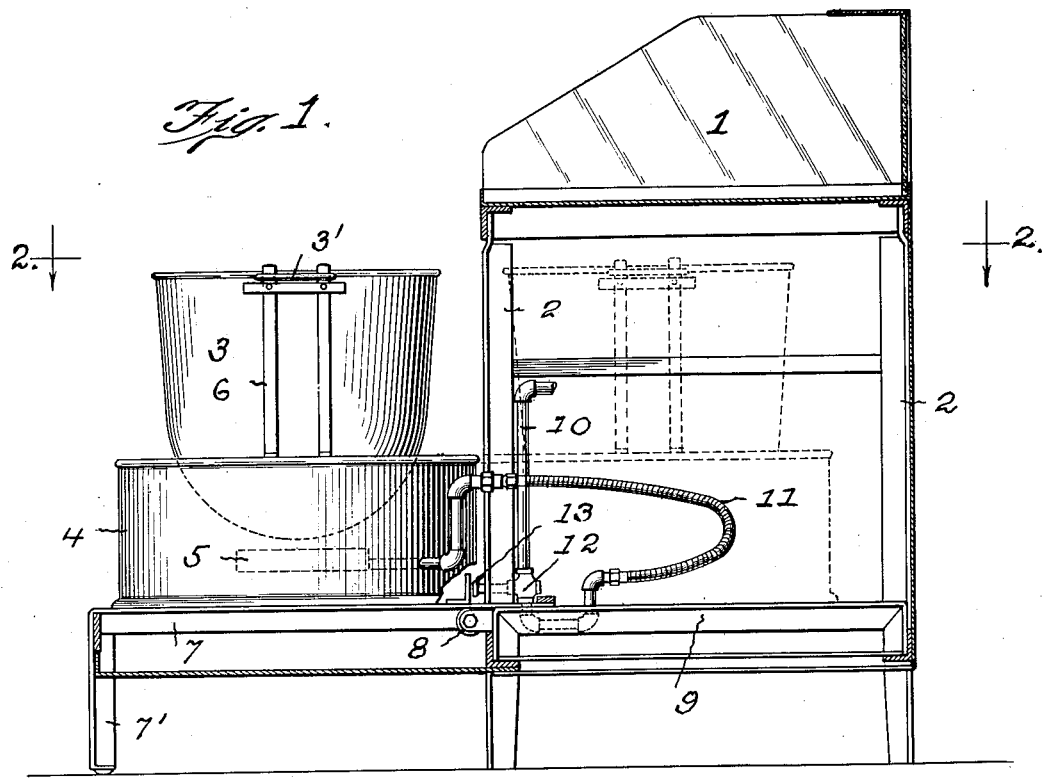
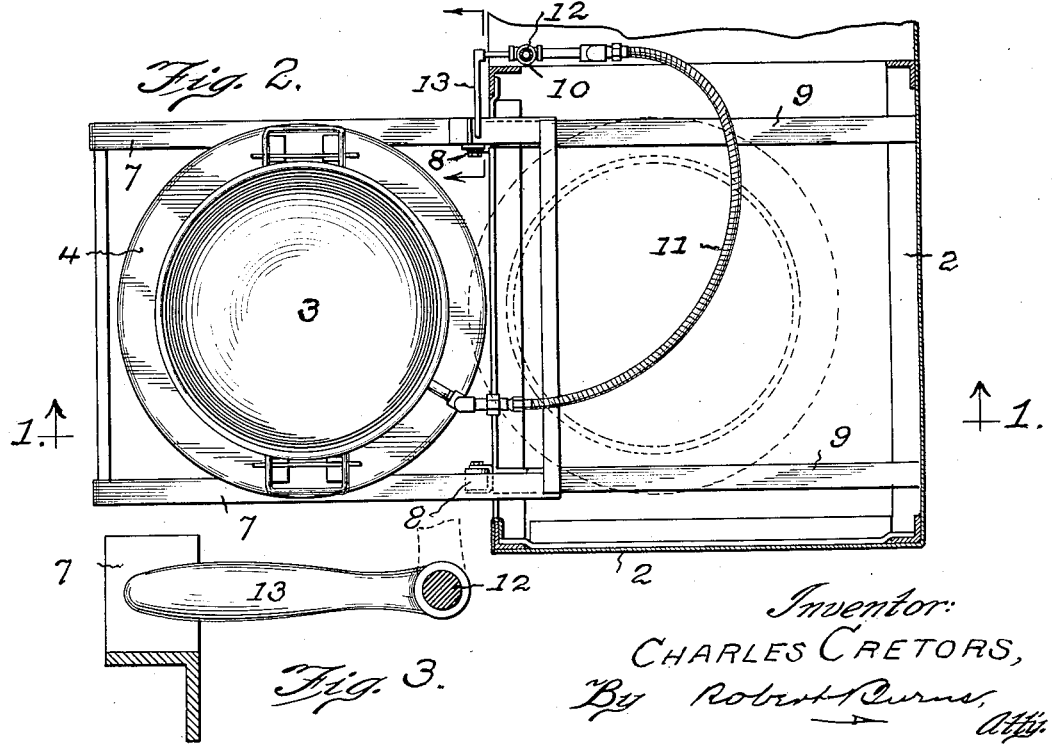
Inventor:
CHARLES CRETORS,
By Robert Burns,
Atty.

Patented Nov. 14, 1933

1,935,435

UNITED STATES PATENT OFFICE 1,935,435

COMBINED MELTING POT AND WORK-STAND

Charles Cretors, Chicago, Ill.

Application December 14, 1931
Serial No. 580,813

3 Claims. (Cl. 126—345)

This invention relates to that type of melting pots used by confectioners and the like, and more especially for use in coating pop-corn with a sweetening material, such as caramel. And the improvement has for its object:

To provide a structural formation and association of parts combining a work stand or table and a melting pot, in which the melting pot is movable in relation to the work stand, so that when required for use the melting pot may be moved into a position wholly outside and in front of the work stand for convenient access, and when not required for use can be moved into a position wholly in the interior of the supporting frame of the table portion of the work stand, in a stored and out of the way condition.

To provide a formation and combination of parts in an apparatus of the type above referred to, whereby the gaseous fuel or like heat producing means used in connection with the melting pot is maintained in constant conection with the burner element of the pot heating means, and in conection with such arrangement the provision of means whereby the flow of the gaseous fuel, or the like, to said burner is shut off before an initial movement of the melting pot into a stored condition with the work stand can be effected, all as will hereinafter more fully appear.

In the accompanying drawing:

Fig. 1 is a transverse sectional elevation on line 1—1 Fig. 2, of a combined work stand and melting pot, illustrating the preferred form of the adjustable connecting means between the melting pot and the stationary work stand and fuel supply source.

Fig. 2 is a top view of same, with parts in section on line 2—2 Fig. 1.

Fig. 3 is an enlarged fragmentary section on line 3—3 Fig. 2 of the means for compelling the shut-off of the fuel supply before a storage movement of the melting pot can be effected.

Like reference numerals indicate like parts in the different views.

In this improvement the work stand, table or counter, comprises the ordinary flat table top or bed 1 and a skeleton frame 2 for supporting the top 1 at a convenient working height above the floor and with the interior of said frame adapted to receive and house the melting pot and accessories in a position of non-use.

The melting pot 3, above referred to, is of the ordinary open top type with its bottom portion preferably of the semispherical form shown, and is supported above a base or housing 4 which encloses the burner or heating element 5, to constitute the heating chamber for the melting pot. To such end the top of the base 4 is of an open top formation adapted to receive the lower end of the melting pot 3 with a view to attain effective heating action on the pot, and the described relation of the melting pot 3 and the base 4 is attained by upright standards 6 secured to the base 4 at opposite sides of the melting pot 3, with their upper ends in supporting engagement with lateral ears 3' on the melting pot.

Operative connection and guidance between the supporting frame 2 of the work stand and the melting pot 3 and accessories, so that such pot and accessories, in a condition of non-use, may be moved into the interior of the frame 2 in a stored and out of the way condition, and from such stored condition moved entirely out from said supporting frame 2 for easy and convenient access when in actual use. Such movements of the melting pot and accessories are attained by the following intermediate connections:—

As shown in Figs. 1 and 2, a bottom frame 7, usually of plate and structural metal, forms the support for the aforesaid heater base 4 and superimposed melting pot 3, with said frame formed for sliding engagement on horizontal truck rails 9, fixedly mounted in the interior of the skeleton frame 2 aforesaid, with the forward end of the track rails carrying bearing rollers 8, adapted to afford easy movement of said bottom frame in its travel on the track rails. At its forward end the frame 7 is provided with supporting legs 7', with the combined arrangement adapted to attain movement in a horizontal plane of the melting pot 3 and accessories into and out of the interior of the supporting frame 2 aforesaid.

In the construction shown, communication between the stationary gaseous fuel supply pipe 10 and the burner 5, of the heating means of the melting pan 3, by a looped tubular connection 11 of a flexible formation, and connected at one end to said supply pipe 10 and at the other end to the burner 5, as shown. With such construction the valve 12 by which the supply of fuel gas to the burner of the apparatus is located in the supply pipe 10 aforesaid, and is provided with an operating hand lever 13, which is adapted in an open condition of the valve 12 to lie in the path of the truck frame 7 of the melting pot, and require its movement out of such path, with a closure of the valve 12, before the melting pot 3 and its accessories can be moved into the stored condition heretofore described in the interior of the supporting frame 2 of the work stand.

While the construction shown in the drawing illustrates the use of a gaseous fuel as the preferred heating means, it is within the scope of the invention to substitute any other ordinary and equivalent heating means.

Having thus fully described my invention, what I claim as new, is:—

1. A confectioner's melting apparatus, comprising in combination a hollow supporting frame of the table type, a horizontal track fixed within said frame, an open top melting pot, a heating element associated with said pot, a casing forming an enclosure for said heating element and a bottom support for the melting pot and provided at front with a supporting leg, said casing having sliding movement on the track aforesaid to effect a transfer of the melting pot and accessories carried by the casing into and out of the interior of the hollow supporting frame, and a flexible conductor for the medium by which the aforesaid heating element is activated, one end of said conductor having connection with a fixed source of supply of the heating medium and at the other end to the rear portion of the casing and heating element aforesaid, said conductor being of a horizontally arranged loop form.

2. A confectioner's melting apparatus as specified in claim 1, and wherein the aforesaid horizontal track is provided at its front end with a bearing roller to aid in a free sliding movement of the casing in which the heating element is enclosed and by which the melting pot is supported.

3. A confectioner's melting apparatus as specified in claim 1, and wherein the stationary end of the flexible conductor is associated with a controlling valve having an operating hand lever arranged in the path of a stop projection on the enclosing casing of the heating element so as to require the removal of the lever out of said path, with a closure of the valve, before said casing and associated heating element and melting pot can be moved into the cavity of the hollow supporting frame aforesaid.

CHARLES CRETORS.